United States Patent
Gee et al.

(10) Patent No.: US 9,327,981 B2
(45) Date of Patent: May 3, 2016

(54) METHOD FOR PRODUCING THIN GRAPHENE NANOPLATELETS AND PRECUSOR THEREOF

(71) Applicant: NATIONAL CHUNG SHAN INSTITUTE OF SCIENCE AND TECHNOLOGY, Taoyuan (TW)

(72) Inventors: Chuen-Ming Gee, Taoyuan (TW); Tzeng-Lu Yeh, Taoyuan (TW); Yi-Cheng Cheng, Taoyuan (TW); Ching-Jang Lin, Taoyuan (TW); Cheng-Te Lin, Taoyuan (TW); Lain-Jong Li, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 305 days.

(21) Appl. No.: 13/719,206

(22) Filed: Dec. 18, 2012

(65) Prior Publication Data

US 2014/0166500 A1    Jun. 19, 2014

(51) Int. Cl.
*C25B 1/00* (2006.01)
*C01B 31/04* (2006.01)

(52) U.S. Cl.
CPC ......... *C01B 31/0446* (2013.01); *C01B 31/0484* (2013.01); *C25B 1/00* (2013.01)

(58) Field of Classification Search
CPC .... C01B 31/0446; C01B 31/0484; C25B 1/00
See application file for complete search history.

(56) References Cited

U.S. PATENT DOCUMENTS

| 2009/0155578 A1* | 6/2009 | Zhamu et al. ................ 428/336 |
| 2013/0015409 A1* | 1/2013 | Fugetsu ........................ 252/500 |

OTHER PUBLICATIONS

Kim et al., Enhanced thermal conductivity of carbon fiber/phenolic resin composites by the introduction of carbon nanotubes, (Mar. 2, 2007) American Institute of Physics, Applied Physics Letters 90, 093125 (pp. 1-3).*

* cited by examiner

*Primary Examiner* — Arun S Phasge
(74) *Attorney, Agent, or Firm* — Anova Law Group, PLLC

(57) ABSTRACT

Disclosed is a method of producing thin graphene nanoplatelets, and the method includes the steps of providing a carbon precursor and a filling material, using the carbon precursor as a binding agent to mix with the filling material thoroughly, producing a composite material through a forming process, performing a heat treatment of the composite material under an atmosphere and at different temperatures to improve the electrical conductivity and adjust to an appropriate binding strength, perform a carbon conversion of the composite material with a good graphite cyrstallinity to produce a layered graphite structure of a thin graphene nanoplatelet precursor, while obtaining high quality graphene by performing an electrochemical process of the thin graphene nanoplatelet precursor, so as to achieve the mass production of the high quality thin graphene nanoplateletes with a low cost.

7 Claims, 2 Drawing Sheets

METHOD FOR PRODUCING THIN GRAPHENE NANOPLATELETS AND PRECUSOR THEREOF

BACKGROUND OF THE INVENTION

1. Field of the Invention

The present invention relates to a method for producing graphene, and more particularly to the method for producing thin graphene nanoplatelets and thin graphene nanoplatelet precursors.

2. Description of Related Art

Graphene, also known as single-layer graphite, is a planar thin film with a hexagonal honeycomb lattice formed by bonding carbon atoms at the sp2 orbit and a two-dimensional material with a thickness of one carbon atom (approximately 0.34 nm).

At present, graphene is the thinnest and hardest nanomaterial substantially transparent and having a heat conductivity coefficient up to 5300 W/m·K which is higher than that of carbon nanotubes or diamond, and this material is suitable for manufacturing heat conductive materials and thermal boundary materials. At room temperature, the electron mobility of graphene (exceeding 15000 $cm^2/V·s$) is approximately equal to 1.5 times of the electron mobility of a carbon nanotube (approximately 10000 $cm^2/V·s$) and ten times of the electron mobility of a crystalline silicon (approximately 1400 $cm^2/V·s$), and the resistance of graphene is approximately equal to $10^{-6}$ Ω·cm which is lower than the resistance of copper and silver, so that graphene is considered as a material with the smallest resistance now. Due to the very low resistance, the electron mobility of graphene is very high, so that graphene is expected to be used for the development of new-generation thinner and more highly conductive electronic devices. Since graphene is a substantially transparent conductor, it is suitable for the manufacture of transparent touch screens, light panels, lithium batteries, super capacitors and solar cells.

In general, graphene is prepared or produced by the following four main methods. (1) Mechanical exfoliation method: Graphene is manufactured from graphite, and this method can produce single-layer or multi-layer graphene simply, easily and quickly, but this method is suitable for the manufacture of a small quantity of graphene only; (2) Chemical vapor deposition method or an epitaxial growth method: Graphene is manufacturing by passing and depositing a thermally cracked hydrocarbon gas source onto a nickel or copper plate. This method has the feature of producing large-area single-layer or multi-layer graphene easily and the difficulty of controlling the uniformity and thickness of the graphene; (3) Method of growing graphene on an insulating substrate: A very thin layer of graphene is grown on a surface of silicon carbide. The method has the drawbacks of incurring a high cost and having difficulties of manufacturing large-area graphene; and (4) Method of using organic acidic solvent to insert layers to produce graphene oxide (GO) and obtaining grapheme by a reduction procedure: This method has the drawbacks of requiring a long processing time, and having an inconsistent quality of the grapheme since the reduced grapheme may be deformed or warped easily.

In the aforementioned techniques, high-purity natural graphite powder or expensive sheet monocrystalline natural graphite is used as the raw material, and a chemical acid intercalation process is provided for producing the graphene, and thus the processing is very long and requires a reduction process before high-quality graphene can be obtained, and mass production of graphene is not easy. Therefore, it is a main subject for related manufacturers to develop a method of producing a thin graphene nanoplatelet precursor with high efficiency and cost-effectiveness and applying the precursor in the manufacture of thin graphene nanoplatelets, while taking the cost and time into consideration for manufacturing the thin graphene nanoplatelets effectively.

SUMMARY OF THE INVENTION

In view of the aforementioned problems of the prior art, it is an objective of the present invention to provide a method of producing thin graphene nanoplatelets and a precursor thereof, so as to integrate a carbon precursor, a filling material, a thin graphene nanoplatelet precursor, an electrochemical process to manufacture high-efficiency, high-quality and cost-effective thin graphene nanoplatelets.

To achieve the aforementioned objective, the present invention provides a method of producing thin graphene nanoplatelet precursor, and the method comprises the following steps: (A) Provide a carbon precursor and a filling material, and mix the carbon precursor with the filling material to form a uniform mixture; (B) Perform a forming process of the uniform mixture to obtain a composite material; (C) Perform a heat treatment of the composite material in a gaseous environment to obtain a thin graphene nanoplatelet precursor.

In the step (A), the carbon precursor is one selected from the collection of petroleum pitch, coke-base pitch, mesophase pitch, phenolic resin, furan resin, epoxy resin, polyimide or any mixture of the aforementioned polymers. The filling material of the step (A) is one selected from the collection of petroleum charcoal, charcoal, natural graphite, thermally cracked graphite, mesophase carbon microsphere, carbon nanotube, vapor grown carbon fiber, carbon fiber, graphite fiber, artificial graphite powder, or any mixture of the above.

In the aforementioned procedure, the carbon precursor and the filling material are mixed with a specific ratio, wherein if the carbon precursor and the filling material have percentages by weight with a ratio falling within a range of 1:1~19, then the thin graphene nanoplatelet precursor can be manufactured. In a preferred embodiment, the carbon precursor and the filling material have percentages by weight with a ratio falling within a range of 1:2~9.

In the step (B), a mixing process is included, wherein the carbon precursor and the filling material are mixed thoroughly, and the mixing process can be a mixing, ball milling, planetary rotation mixing or high speed homogenous mixing process or any combination of the above for mixing the carbon precursor and filling material. The step (B) further comprises a forming process which can be an oil pressing, mold pressing, hot pressing, squeezing, extrusion, injection, spinning, or melt spinning process or any combination of the above for performing the forming process. The main function of the forming process is to use the aforementioned measure to achieve the effect of pressing the material and use the pressure to increase the density of the composite material.

The step (C) comprises a heat treatment process performed at a temperature range of 15~3200° C., preferably falling within a range of 50~3200° C. The heat treatment has the effects of increasing the electrical conductivity of the composite material, adjusting to an appropriate binding strength, and promoting the carbon conversion of the carbon precursor and the filling material with a good graphite cyrstallinity to produce a composite material containing a layered graphite structure. In the heating process, the interference by oxygen should be avoided, so that the heat treatment process should be held in an gaseous environment filled up with nitrogen, argon, an inert gas or any other gas not reacted with the composite material.

To achieve the aforementioned objective, the present invention provides a method of producing thin graphene nanoplatelet precursor, and the method comprises the following steps: (a) Produce a thin graphene nanoplatelet precursor by the foregoing method. (b) Process the thin graphene nanoplatelet precursor by an electrochemical process, wherein the electrochemical process includes an electrolytic solution; (c) Filter the electrolytic solution to obtain a thin graphene nanoplatelet. Therefore, the present invention can be used for producing high-efficiency, high-quality and cost-effective thin graphene nanoplatelets.

DETAILED DESCRIPTION OF THE PREFERRED EMBODIMENTS

The technical characteristics of the present invention will become apparent with the detailed description of preferred embodiments and the illustration of related drawings as follows.

Figure 1:
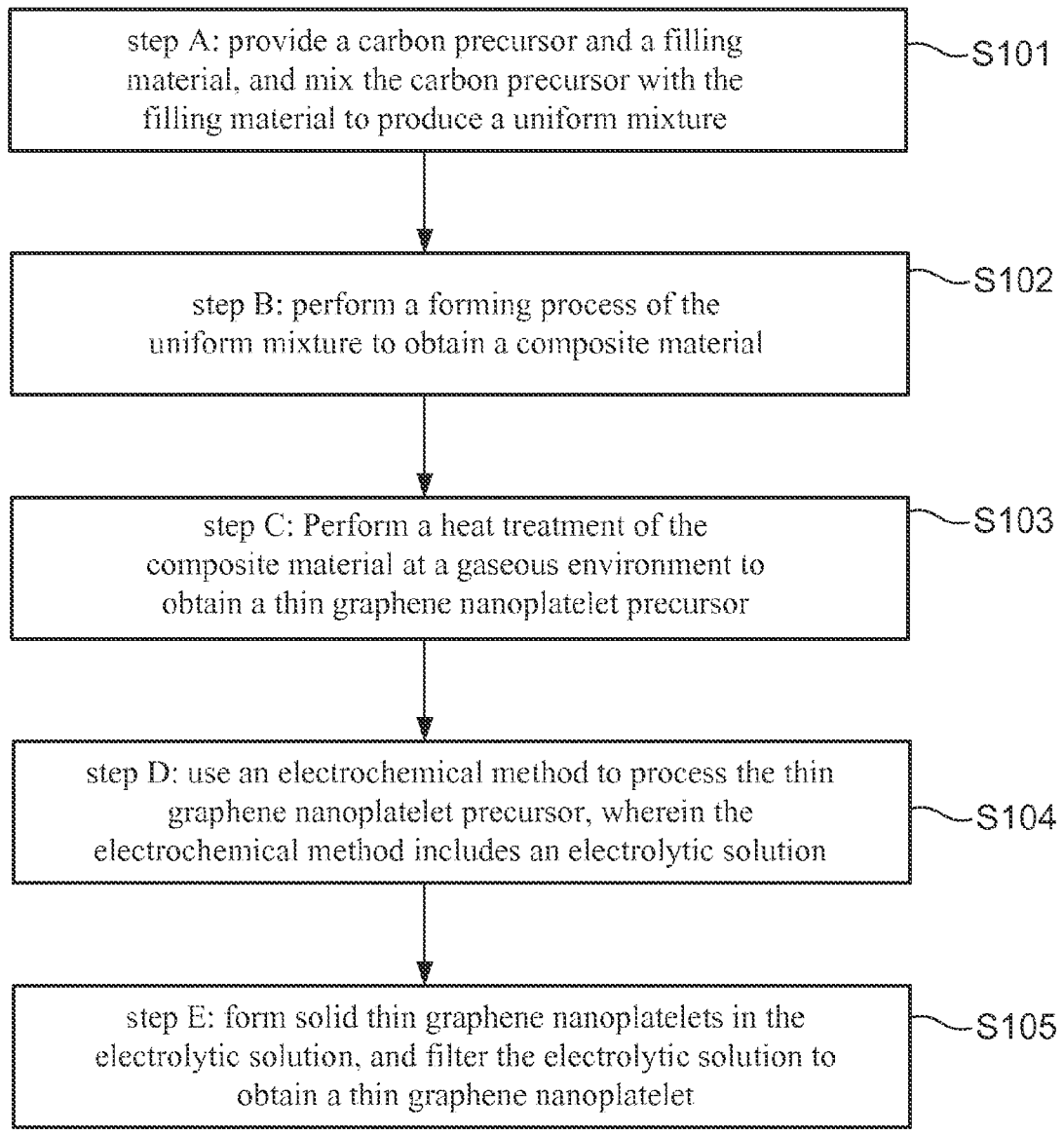
FIG. 1 is a flow chart of a method for producing a thin graphene nanoplatelet precursor in accordance with the present invention.

With reference to FIG. 1 for a flow chart of a method of producing a thin graphene nanoplatelet precursor, the method of producing a thin graphene nanoplatelet precursor comprises the following steps. (A) Provide a carbon precursor and a filling material, and mix the carbon precursor with the filling material to produce a uniform mixture (S101). In this preferred embodiment, the carbon precursor is a mesophase pitch or a filling material which is a natural graphite. When the carbon precursor and the filling material are mixed by a planetary rotation mixing process, the carbon precursor can be used as a binding agent, so that the carbon precursor and the filling material can be mixed uniformly and adhered with each other to produce a uniform mixture. In the aforementioned procedure, the carbon precursor tends to be covered onto the filling material uniformly.

Step (B): Perform a forming process of the uniform mixture to obtain a composite material (S102). In this preferred embodiment, a hot pressing forming process is used to press the uniform mixture into a composite material, so as to produce a high-density composite material.

Step (C): Perform a heat treatment of the composite material at a gaseous environment to obtain a thin graphene nanoplatelet precursor (S103). In this preferred embodiment, the composite material is placed in a protection atmosphere of nitrogen or argon and conducted at different temperatures, and the temperature control range is 150~3,200° C., preferably 500~3,200° C. for the purpose of increasing the electrical conductivity of the composite material and adjusting to an appropriate binding strength, while promoting the conversion of the composite material with a good graphite crystalline to produce a layered graphite structure, so as to produce a high-quality graphene precursor.

Step (D): Use an electrochemical method to process the thin graphene nanoplatelet precursor, wherein the electrochemical method includes an electrolytic solution (S104). In this preferred embodiment, the electrochemical method includes a first electrode, a second electrode and an electrolytic solution, and the thin graphene nanoplatelet precursor can be the first electrode submerged in the electrolytic solution, and different bias voltages are used to perform processes including intercalation and exfoliation of the thin graphene nanoplatelet precursor.

Step (E): Form solid thin graphene nanoplatelets in the electrolytic solution, and filter the electrolytic solution to obtain a thin graphene nanoplatelet (S105).

The method of the present invention adopts mesophase pitch as the carbon precursor and natural graphite as the filling material, wherein the mesophase pitch serves as a binding agent. The aforementioned materials can be mixed by planetary rotation mixing, and the mixture is pressed by hot pressing to produce a composite material, and a heat treatment of the composite material is performed in a nitrogen atmosphere, and the composite material is exfoliated by an electrochemical method quickly after the heat treatment takes place, and then the electrolytic solution is filtered, separated and washed to produce high-quality thin graphene nanoplatelets, and related parameters for the processes are listed in Table below.

TABLE 1

Parameters for Experiment Process

| No. | Natural Graphite:Mesophase Pitch | Heat treatment temperature (° C.) | Electrolyte/ Concentration (wt %) |
|---|---|---|---|
| 1 | 4:1 | 600° C. | sulfuric acid/4.7 |
| 2 | 4:1 | 1,000° C. | sulfuric acid/4.7 |
| 3 | 4:1 | 2,300° C. | sulfuric acid/4.7 |
| 4 | 4:1 | 600° C. | sulfuric acid/4.7 + potassium hydroxide/3.3 |
| 5 | 4:1 | 1,000° C. | sulfuric acid/4.7 + potassium hydroxide/3.3 |
| 6 | 4:1 | 2,300° C. | sulfuric acid/4.7 + potassium hydroxide/3.3 |
| 7 | 9:1 | 2,300° C. | sulfuric acid/4.7 |
| 8 | 3:2 | 2,300° C. | sulfuric acid/4.7 |

Figure 2:
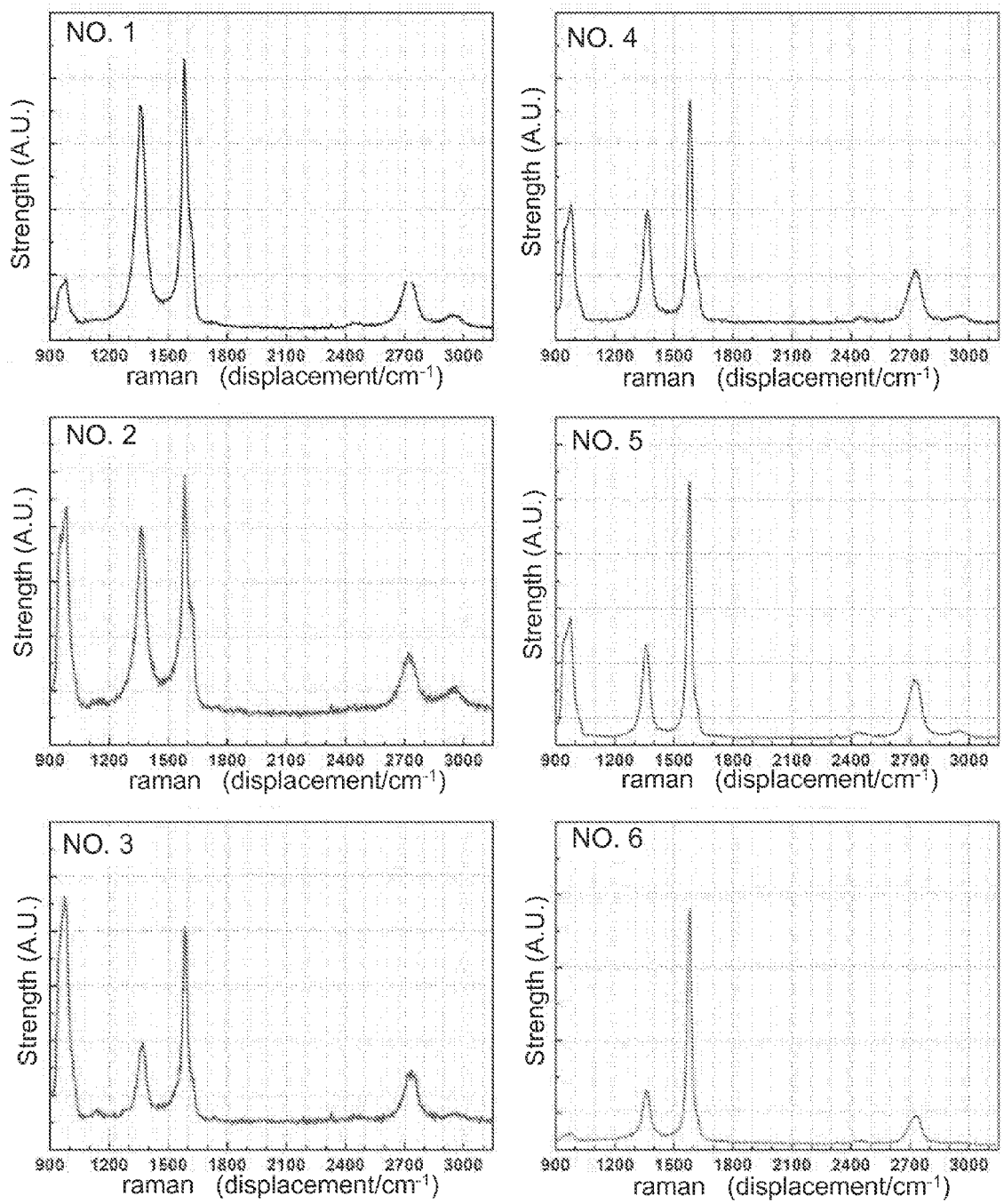
FIG. 2 shows Raman spectra of thin graphene nanoplatelets in accordance with the present invention.

Eight sets of parameters are used for manufacturing composite materials in accordance with different preferred embodiments of the present invention respectively, and the processes are numbered with Nos. 1 to 8, and all of the composite materials at different conditions are exfoliated electrochemically by a constant DC voltage −10~+10 V, wherein the composite material obtained from the No. 7 process may be collapsed easily, and the percentage of producing graphite powder is relatively too high, thus resulting in a low quality of graphene quality. The yield rate of the No. 8 process is relatively too low, and thus the quantity of produced graphene is too little. The graphene obtained from the No. 1~6 processes are measured by Raman spectroscopy. With reference to FIG. 2 for the Raman spectra of thin graphene nanoplatelets of the present invention, the effects of the heat treatment temperature of the composite material on the quality of graphene are compared. With the conditions of the same electrolyte and concentration, the best quality (or a low defective density) of graphene can be obtained by performing the heat treatment at 2300° C. in the Nos. 3 and 6 processes. In the comparison of the effect of the electrolyte on the quality of the graphene, and the heat treatment of samples is taken place at the same temperature, if potassium hydroxide is added into the electrolyte for neutralization, the quality of graphene obtained from No. 1, 2 and 3 processes is lower than the quality of graphene obtained from No. 4, 5 and 6 processes. The aforementioned process can produce high-quality single-layer thin graphene nanoplatelets.

While the invention has been described by means of specific embodiments, numerous modifications and variations could be made thereto by those skilled in the art without departing from the scope and spirit of the invention set forth in the claims.

What is claimed is:

1. A method of producing thin graphene nanoplatelet precursor, comprising the steps of:
   (A) providing a carbon precursor and a filling material, and mixing the carbon precursor with the filling material by ball milling, planetary rotation mixing, or high speed homogenous mixing to form a uniform mixture, wherein the carbon precursor is made of a polymer material selected from a first collection of petroleum pitch, coke tar pitch, mesophase pitch, phenolic resin, furan resin, epoxy resin and polyimide, or the carbon precursor is made of any mixture of the first collection, and wherein the filling material is one selected from a second collection of petroleum coke, coal coke, natural graphite, thermally cracked graphite, carbon nanotube, carbon fiber, mesophase carbon microsphere, vapor grown carbon fiber, graphite fiber and artificial graphite powder, or the filling material is any mixture of the second collection;
   (B) performing a forming process of the uniform mixture to obtain a composite material, wherein the forming process is one selected from oil pressing, mold pressing, squeezing, extrusion, injection, spinning, and melt spinning forming process; and
   (C) performing a heat treatment of the composite material in a gaseous environment to obtain a thin graphene nanoplatelet precursor.

2. The method of producing thin graphene nanoplatelet precursor according to claim 1, wherein the carbon precursor and the filling material have percentages by weight in the ratio of 1:1~19.

3. The method of producing thin graphene nanoplatelet precursor according to claim 1, wherein the gas is one selected from the collection of nitrogen, argon.

4. The method of producing thin graphene nanoplatelet precursor according to claim 1, wherein the heat treatment is performed at a temperature range of 150~3,200° C.

5. A method of producing thin graphene nanoplatelets, comprising the steps of:
   (a) providing a thin graphene nanoplatelet precursor produced according to claim 1;
   (b) using an electrochemical method to process the thin graphene nanoplatelet precursor, wherein the electrochemical method includes an electrolytic solution; and
   (c) filtering the electrolytic solution to obtain a thin graphene nanoplatelet.

6. The method of producing thin graphene nanoplatelets according to claim 5, wherein the electrolytic solution includes a sulfuric acid.

7. The method of producing thin graphene nanoplatelets according to claim 5, wherein the electrolytic solution includes a peroxide.

* * * * *